United States Patent [19]
Wibrow

[11] 4,363,160
[45] Dec. 14, 1982

[54] FASTENING ELEMENT OF SYNTHETIC MATERIAL

[75] Inventor: Günter Wibrow, Norderstedt, Fed. Rep. of Germany

[73] Assignee: ITW Ateco GmbH, Norderstedt, Fed. Rep. of Germany

[21] Appl. No.: 83,050

[22] Filed: Oct. 9, 1979

[30] Foreign Application Priority Data

Sep. 20, 1978 [DE] Fed. Rep. of Germany ....... 2840878

[51] Int. Cl.³ ............................................ A44B 17/00
[52] U.S. Cl. ....................................... 24/297; 24/214; 411/509
[58] Field of Search .............. 24/73 P, 73 PF, 73 PM, 24/73 PP, 213 R, 214, 297; 85/5 R; 52/717, 718; 411/508, 509, 510

[56] References Cited
U.S. PATENT DOCUMENTS

| | | | |
|---|---|---|---|
| 2,531,264 | 11/1950 | Flora | 85/5 R X |
| 2,882,780 | 4/1959 | Edwards | 85/5 R |
| 3,093,874 | 6/1963 | Rapata | 85/5 R X |
| 3,210,030 | 10/1965 | Ramsey et al. | 85/5 R X |
| 3,251,103 | 5/1966 | Saut | 52/718 |
| 3,309,955 | 3/1967 | Turnbull et al. | 85/5 R |
| 3,342,095 | 9/1967 | Bunac | 85/5 R |
| 3,665,800 | 5/1972 | Ryder | 411/508 X |
| 3,678,797 | 7/1972 | Selkerson | 85/5 R |
| 3,775,927 | 12/1973 | Meyer | 85/5 R X |

FOREIGN PATENT DOCUMENTS

| | | | |
|---|---|---|---|
| 1254784 | 1/1961 | France | 85/5 R |
| 1336715 | 7/1963 | France | 24/73 PM |
| 1460827 | 10/1966 | France | 24/73 PM |
| 7600131 | 10/1976 | France | 85/5 R |
| 887816 | 1/1962 | United Kingdom . | |
| 896794 | 5/1962 | United Kingdom . | |
| 939695 | 10/1963 | United Kingdom . | |
| 1012967 | 12/1965 | United Kingdom . | |
| 1135470 | 12/1968 | United Kingdom | 24/73 PM |
| 1357738 | 6/1974 | United Kingdom . | |

Primary Examiner—Thomas J. Holko
Attorney, Agent, or Firm—Jerold M. Forsberg; Thomas W. Buckman; Jack R. Halvorsen

[57] ABSTRACT

The invention relates to a fastening element of synthetic material comprising a sleeve-like hollow insert member adapted to be inserted into a prefabricated opening in a carrier plate and engaging beneath the underside of the opening edge by means of an undercut formed integrally therewith, and a head member connected to the insert member for fastening an article at the carrier member, with either the article to be fastened or the head member lying in close engagement with the side of the carrier plate opposite the undercut.

5 Claims, 9 Drawing Figures

FASTENING ELEMENT OF SYNTHETIC MATERIAL

BACKGROUND OF INVENTION

Such a fastening element is already known (German utility model 7 503 898). It is employed for the fastening of ornamental ledges and comprises a head member designed in the form of a ledge retaining means with a sealing screen, said sealing screen lying in close contact against the carrier plate from one side thereof.

A hollow shank portion closed at the bottom and symmetrical with respect to rotation is provided with a restriction so that the edge of the carrier plate opening is received in the restriction.

Such fastening elements which are employed for a concealed, i.e. an invisible, type of fastening and which normally are pre-assembled with the article to be fastened are required to be capable of being simply fixed and easily mounted, they should have high forces of retention and seal the openings in the carrier sheet metal member against moisture. These requirements the above described fastening element meets only partially, especially with a view to the forces of impression and withdrawal, respectively. In the case of the known fastening element these may be varied only by changing the angles of introduction and the angles of undercutting with the ratio of the force of impression to the force of withdrawal being almost equal.

Apart from the known one-piece fastening element also such fastening elements have become known which consist of two cooperating members the one of which being adapted to be fitted in the opening of the carrier plate as an insert sleeve and the other member being designed as a retaining bolt with a head plate for the reception of a hollow ledge, with the retaining bolt penetrating through the sleeve and tightening in the axial direction of movement. In this arrangement it is disadvantageous that in case of repair the insert sleeve must be separately removed from the carrier plate.

SUMMARY OF INVENTION

The invention solves the problem of providing a fastening element which can be easily mounted but strongly resists withdrawal forces while simultaneously substantially sealing the opening in the carrier plate.

More specifically, the problem is solved in accordance with the present invention by the arrangement of a connecting means extending between the fastening element and a spaced head member, with the connecting means being connected to the hollow interior of the fastening element and below the undercut forming its exterior shoulder means.

In the known fastening element, cited above, the hollow shank of the insert member directly merges with the head member, the hollow shank of the insert member in the case of the fastening element according to the present invention is not directly connected to the head member, rather, the point where the application force is introduced lies below the carrier plate. Thus, when being mounted, the insert member is not forced into the opening but is pulled into it. Therefore, the region of the hollow insert member which gets into engagement with the material forming the opening may be provided with a sufficient degree of oversize for obtaining a sufficient sealing effect without causing any difficulties during assembly.

In case of removal of the fastening element according to the present invention, from the carrier plate opening, or, in case of a load effective in the same direction, the reorientation of the force onto the wall of the insert member results in the annular shank of the insert member being slightly upset and slightly bulging. The engagement between the undercut and the carrier plate is thereby further enhanced. Thus, self-reinforcing retaining forces will form in the case of the fastening element according to the invention in the direction of withdrawal so that the force of withdrawal with the fastening element according to the invention is much higher than the force of insertion.

The connection arrangement between head member and insert member with the fastening element according to the invention may be designed in different ways suiting the purpose. In one embodiment of the invention provision is made to this end for one or several connecting webs to be connected by the upper ends thereof to the head member and by the lower ends thereof to the insert member inside thereof. The webs are preferably formed to extend directly along the inner wall of the insert member and are rigidly connected to the wall over the height of the insert member. But it is also imaginable that a central shank may be arranged in the center of the insert member and may be connected at the lower end thereof to the bottom of the insert member. If several webs are provided they are preferably uniformly spaced circumferentially.

The insert member is preferably formed symmetrical with respect to rotation as is known per se. In this connection provision is made in another embodiment of the invention for the radius of the insert member below the undercut to be slightly less in the region of the webs than for the remaining regions of the circumference. This reduction in diameter reduces the shear stress placed on the plastic material during insertion into a panel aperture due to the fact that where the webs are connected to the wall of the insert member the elasticity in this region of the insert member is slightly less than in the remaining region. This may be counteracted, with a fastening element having two diametrically opposed webs, for example, by an undercut having an oval cross sectional area.

To improve the sealing provision is made in another embodiment of the invention for a sealing plate or sealing flange to be arranged at the insert member above the undercut.

BRIEF DESCRIPTION OF DRAWINGS

Some examples of embodiment of the invention will be described in the following in more detail by way of drawings.

FIG. 4 shows an embodiment having a pair of connection webs, FIG. 5 shows an embodiment having three connection webs, and FIG. 6 shows an embodiment having four connection webs.

DETAILED DESCRIPTION

Figure 1:
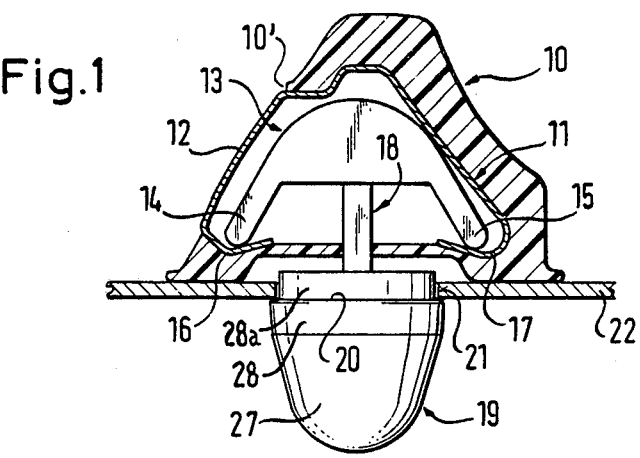
FIG. 1 shows a sectional view of a hollow ledge to be fastened and a fastening element according to the invention for fastening the ledge in a side elevational view.

In FIG. 1 a sectional view is shown of a hollow profile ledge 10 consisting of synthetic material with a resilient metal ledge 11 pushed into the cavity thereof and with the outer profile of said metal ledge 11 being adapted to the inner profile of the ledge 10. One leg of the metal ledge 11 of approximately C-shaped cross sectional area, which is designated with 12, extends through a lateral opening 10' in the ledge 10. The arrangement as described above constitutes an ornamental and ram protection ledge for the body of automotive vehicles, as is known per se.

The head member 13 of a fastening element is pushed into the interior of the metal ledge 11. The head member 13 comprises two downwardly diverging roof-shaped legs 14, 15 which are adapted to be in engagement with the bend ends 16, 17 of the legs of the ledge 11. A connection arrangement 18 is connected to the head member 13, said connecting arrangement being connected at the lower end thereof to an insert member 19. The insert member 19 which is symmetrical with respect to rotation comprises an annular shoulder 20. As will be seen from FIG. 1, the shoulder 20 engages beneath the edge of an opening 21 in a carrier plate 22 (a body sheet metal member, for example).

Figure 2:
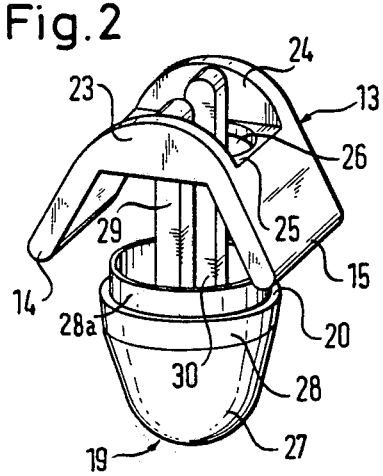
FIG. 2 shows a perspective view of the fastening element according to FIG. 1.
Figure 3:
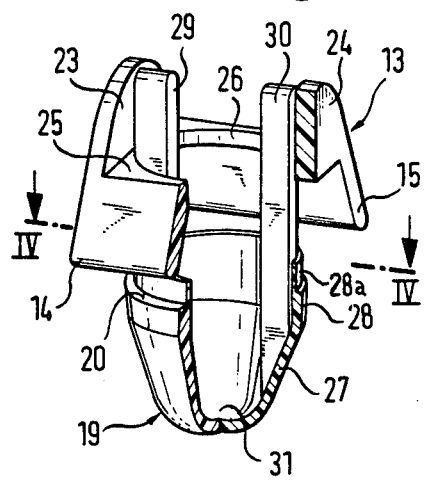
FIG. 3 shows a partial sectional view taken on the fastening element of the invention shown in a perspective view.

The design of the head member may be clearly seen from FIGS. 2 and 3. The legs 14, 15 are connected to each other on opposite sides by upwardly vaulted connection portions 23, 24, with the upper vault or curvature merging steadily into the outer surface of the legs 14, 15. On the underside the connection portions are designed to be straight. Furthermore, the legs 14, 15 are connected to each other via a smooth connection portion 25 disposed between the connection portions 23, 24, with a large opening 26 being formed in the connection portion 25.

The insert member 19 which is symmetrical with respect to rotation may be seen from FIGS. 2, 3, 8 and 9. It is composed of a lower cup-shaped portion 27 with slightly upwardly diverging walls of uniform thickness. Adjoining it upwards is an approximately cylindrical portion 28 which is reduced in diameter to form a thin annular wall portion 28a extending axially above the region of the slightly outwardly inclined shoulder 20. The outer diameter of the thin wall annular portion 28a of reduced diameter above the shoulder 20 is slightly greater than the diameter of the opening 21 in the carrier plate 22 to thereby aggresively engage and seal against the wall forming opening 21.

With the embodiment shown in FIGS. 2, 3, 8 and 9 two connection webs 29, 30 are extending between the insert member 19 and the head member 13. The connection webs 29, 30 are connected to the inner wall of the sleeve-like hollow insert member and extend therealong to the bottom portion 31 of the portion 27. In the upper region thereof the connection webs 29, 30 are formed integrally with the inside of the connection portions 23, 24 and extend as far as shortly above the vaulted upper edge thereof.

Figure 5:
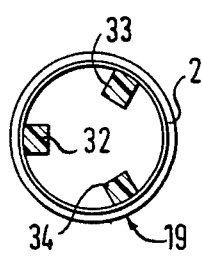
Figure 6:
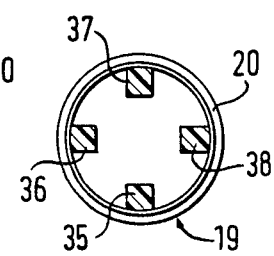

From FIGS. 5 and 6 it may be derived, for example that three or four connection webs 32 to 34 and 35 to 38, respectively, may be provided uniformly spaced circumferentially. Regardless of the number of connection webs it should be clear that as a compressive force is applied to the webs at the end of each where attached to the head member 13, the force is translated along the web to the bottom portion 31 of the insert member 19. Whereby, as the force pushes the bottom portion 31 through the hole 21 the rest of the insert member 19 is pulled through the hole until the shoulder 20 is seated relative to the backside of the plate 22.

Figure 4:
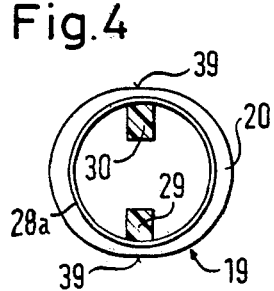
FIGS. 4–6 show sectional views of the representation shown in FIG. 3 taken on line IV—IV, however, for different embodiments, i.e.

From FIG. 4 it may be recognized furthermore that the cross sectional area of the insert member 19 in the region of the shoulder 20 slightly deviates from the circular shape and is slightly flattened as at 39.

Figure 8:
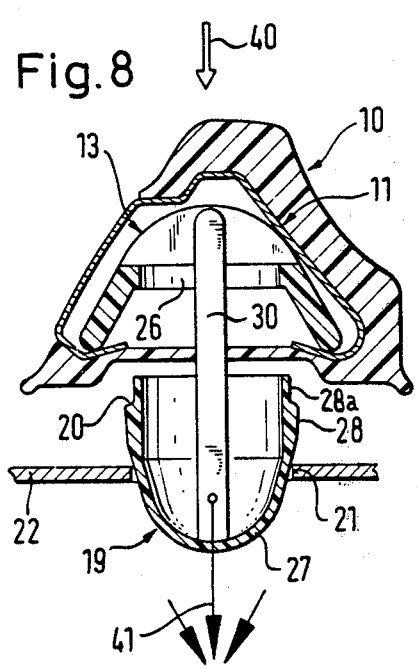
FIG. 8 shows an arrangement similar to the one of FIG. 1, however, during assembly.

The assembly of the above described fastening element together with the hollow ledge 10 may be recognized from FIG. 8. The force of impression which is represented by the arrow 40 is determined, apart from the friction, solely by the elasticity of the sleeve-shaped insert member. It may therefore be kept relatively low. The introduction of the power upon impression is indicated by the arrows 41 in FIG. 8. The insert member 19, namely, is not forced in under pressure but is pulled in. Therefore, the sleeve-shaped insert member may slightly lengthen with the necessary radial contraction so that the mounting will take place with relatively low forces of impression.

In the assembled condition the hollow ledge 10 of synthetic material is pressed against the carrier plate 22 by its parallel-spaced feet 42, 43 with the legs 14, 15 of the head member 13 exerting a contact pressure in the direction towards the carrier plate 22. The webs 29, 30, besides, extend through an elongated slot in the relatively thin bottom wall of the hollow ledge 10.

Figure 9:
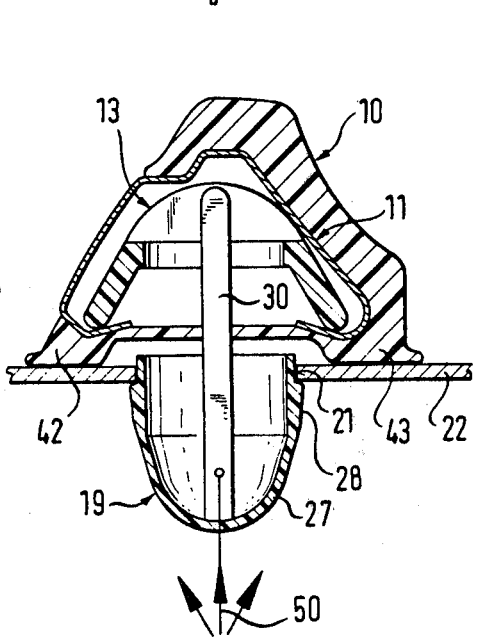
FIG. 9 shows the same arrangement as FIG. 8, however, after assembly.

As best seen in FIG. 9, with force of withdrawal is indicated by the arrow 49. The forces transferred onto the insert member 19 from the head member 13 are indicated at 50. They lead to a bulging up of the insert member 19 and to a reinforcement of the engagement between the shoulder 21 and the edge of the opening; i.e., the insert member 19 increases in diameter due to a tension in the connection webs 29 and 30 pulling on the bottom portion 21. Accordingly, the insertion portion 19 resists being withdrawn from the hole 21 more so than when no force is being applied to the fastener.

Figure 7:
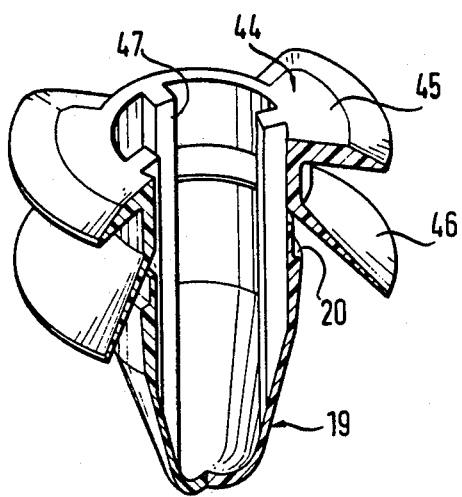
FIG. 7 shows a perspective and sectional view of another embodiment of the fastening element according to the invention.

The fastening element according to FIG. 7 comprises a similar insert member as the fastening element described before. It is therefore refrained from once more enlarging thereon. In contrast to the so far described fastening element the head member 44 comprises a turned-in head 45 of kidney-shaped outline as has become known, for instance, in connection with fastening elements for interior panelling. Axially spaced beneath the turned-in head 45 there is a sealing flange 46 in the form of a tapered ring which comes to lie against the carrier plate from above and prevents moisture from penetrating through the opening (not shown) in the carrier plate. The arrangement of the connection webs 47 (four in the present case) again resembles that of the previously described fastening element.

What is claimed is:

1. A one piece plastic fastening element, adapted to be received in a complimentary hole of a predetermined diameter in a plate-like support, including a cup-shaped hollow insert member open at one end, said insert member having a continuous wall and an external substantially continuous circumferential shoulder formed integrally intermediate the ends of said insert member for engaging beneath the underside of the plate adjacent the edge of the hole, a head member connected in spaced relation to the insert member having means for fastening an article to the carrier plate with either the article to be fastened or the head member lying in close contact against the side of the plate-like support opposite the side engaged by said circumferential shoulder, and connection means extending between, and substantially parallel to the axis of, the insert member and the head member, said connection means extends along the inside of the insert member axially below the circumferential shoulder, said connection means includes at least two connecting webs which are circumferentially spaced and connected at the upper ends thereof to the head member and at the lower ends thereof to the interior of the insert member below a plane passing transversely to the axis of the fastening element and through said circumferential shoulder, said insert member further includes a lower cup-shaped portion having an upwardly and radially flaring wall extending from a closed end, a generally cylindrical portion extending axially from said upwardly flaring wall, and a portion extending axially from said generally cylindrical portion having a reduced external diameter forming said continuous circumferential shoulder, whereby said reduced diameter portion forms an axially extending thin walled annular extension with a substantially unrestricted open end, said external diameter of said reduced diameter portion being slightly greater than the diameter of said complimentary hole whereby said extension is adapted to agressively seal against the side wall of said hole, said head having an opening therein axially aligned with the interior of said cup-shaped hollow insert member thereby permitting access to said interior through said head.

2. A fastening element according to claim 1, wherein said insert member is symmetrical with respect to rotation and the radius of the insert member below the shoulder is slightly smaller in the region of the webs than for the remaining regions of the circumference.

3. A fastening element according to claim 1, wherein there is a sealing flange formed integrally with the head member adapted to engage the side of the plate-like support opposite the side engaged by the shoulder and substantially seal said hole above the undercut.

4. A fastening element according to claim 1 wherein said head member includes at least a pair of side members supported by said webs, downwardly diverging leg portions connected to said side members, said leg portions having free edges at their free ends for engaging the article to be positioned relative to said carrier plate.

5. A fastening element according to claim 1 wherein the number of said webs is greater than two.

* * * * *